Patented Nov. 19, 1946

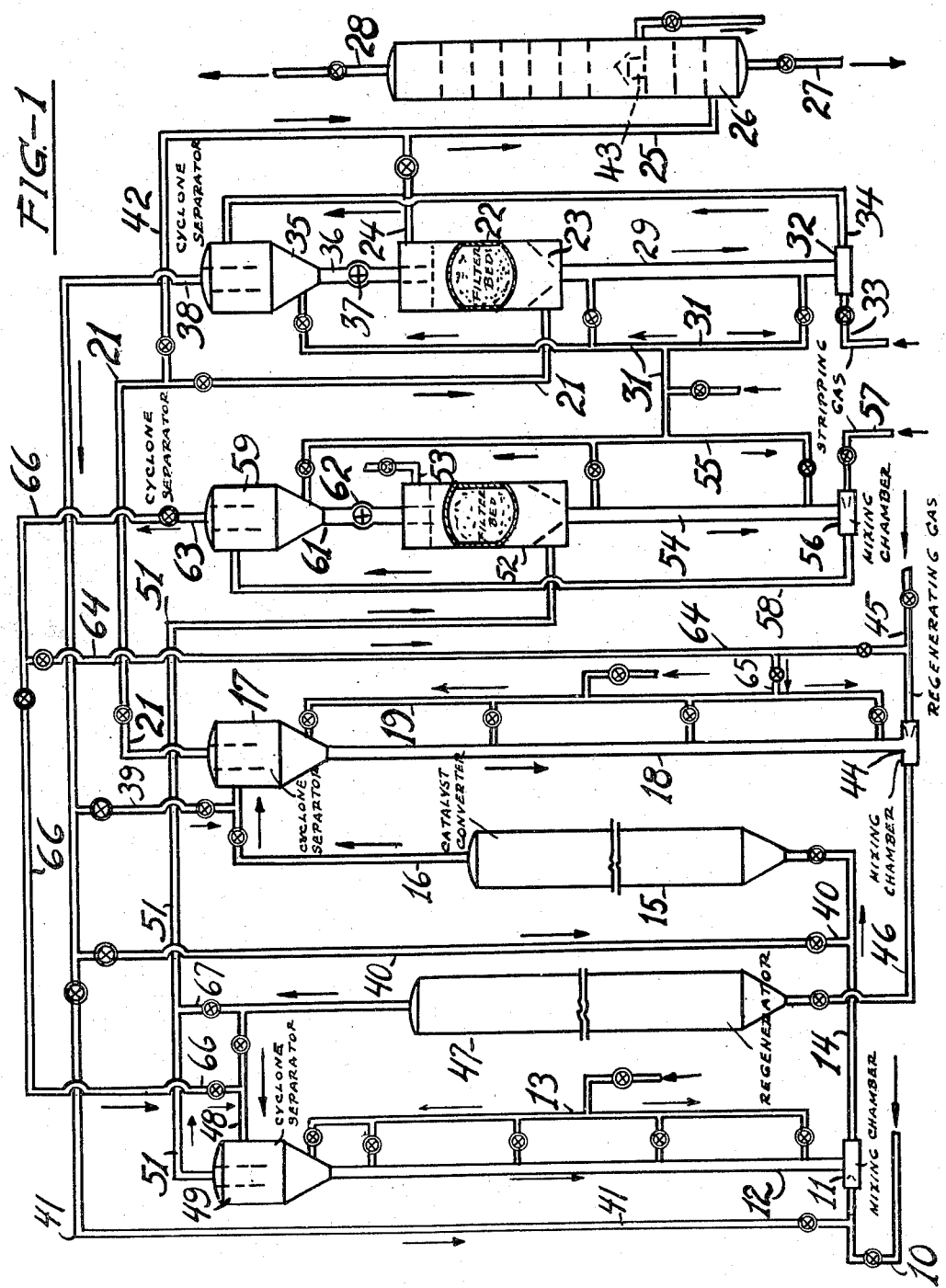

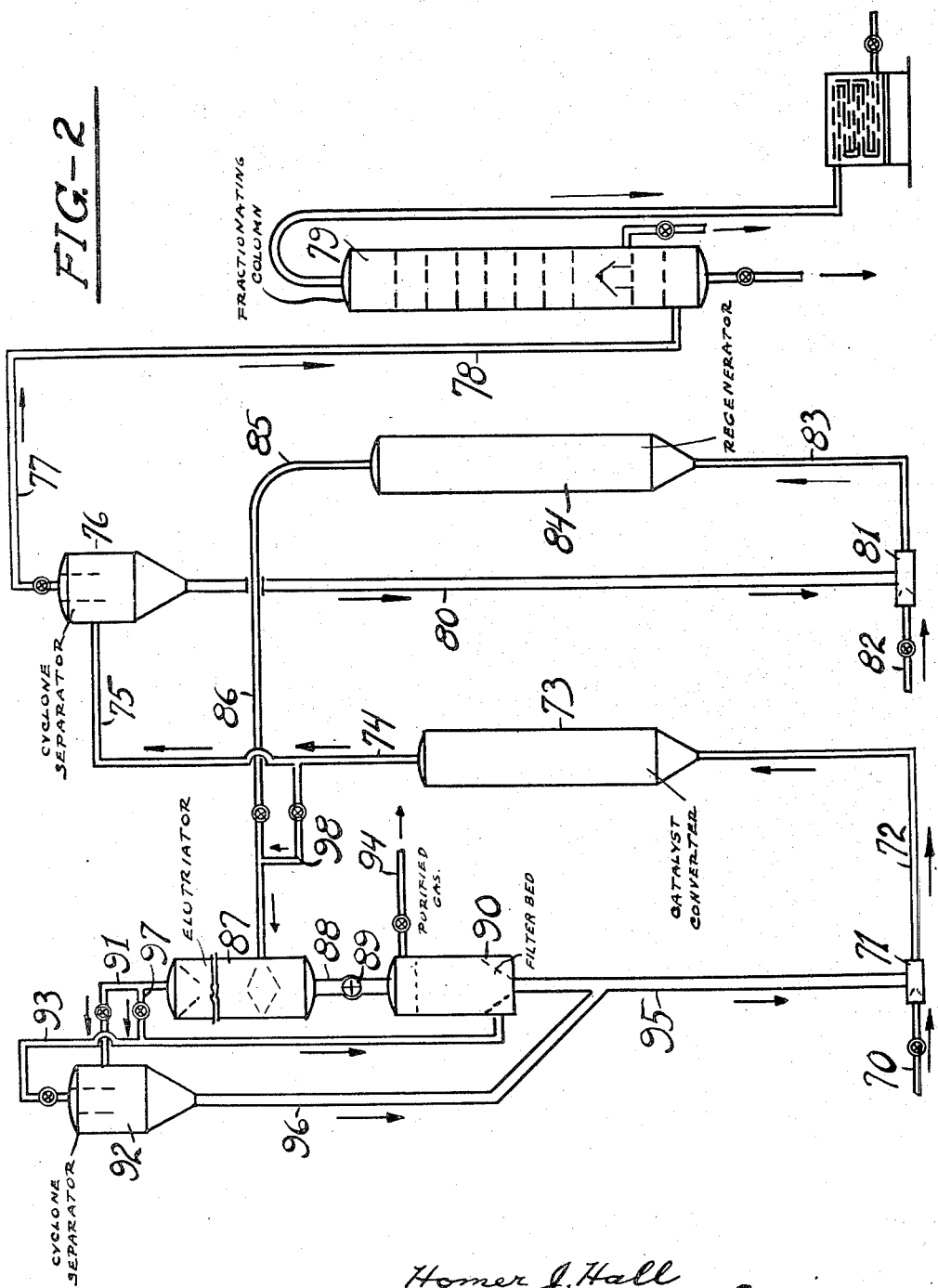

2,411,208

UNITED STATES PATENT OFFICE 2,411,208

PURIFICATION OF GASES

Homer J. Hall, Roselle, and John C. Munday, Cranford, N. J., assignors to Standard Oil Development Company, a corporation of Delaware Application December 28, 1940, Serial No. 372,024

16 Claims. (Cl. 196—52)

This invention relates to the purification of gases, and pertains more particularly to the removal of entrained dust or other finely-divided catalyst particles from the reaction products or regeneration gases recovered from a vapor phase catalytic process.

It has heretofore been proposed to remove dust from gases or vapors by passing the dust-containing gases through one or more filter beds containing coarse particles of an inert filtering medium such as sand. By properly controlling the velocity of gases to be cleaned with respect to the size of the filter particles and the depth of the filter bed, efficient removal of the final traces of dust from the gases can be attained. One of the objections to this method of purification, however, is that the filter beds soon become clogged with dust, which must be removed from the filtering agent before it can be reused. One method for the removal of such dust from the filtering agent is to blast the dust-clogged bed with a stream of high velocity gas in situ, so as to blow off the finely-divided powder. This method of purging the filtering medium of the powder is open to the objection that the dust so removed is merely transferred to an extraneous stream of gas. A further objection is that these processes are either intermittent or require moving mechanical equipment for handling the filter medium.

A still further important objection to purification methods of the type just described is that in catalytic processes the catalyst may become contaminated with finely-divided particles of the filtering agent.

The primary object of the present invention is to provide an improved method of purifying gases which will not be subject to the objections heretofore mentioned in processes of this type.

Other more detailed objects and advantages of the invention will be apparent from the more detailed description hereinafter.

While our invention in its broader phases has a more general application, as will be apparent from the following description, it finds particular adaptation to the catalytic conversion of hydrocarbon oils employing powdered catalyst. For illustrative purposes the invention will be described with specific reference to the catalytic cracking of hydrocarbon oils.

A variety of technically important processes are known which contact a gas with a moving body of finely-divided solid. This principle is applied, for example, in the flash roasting of ores, and in the drying of wet solids or moist gases. It is particularly useful in catalytic processes where it simplifies the problems of temperature regulation and permits an independent control over the resident time of the catalyst and reactant gases within the reaction zone. In any of these cases, the question of separating residual entrained solid from the product gas stream may become important. It is especially so when the contact agent is expensive, or when it is to be used over and over again in a cyclic operation. In the previous alternating or intermittent dust-filtering processes described above, the filtering medium used has often been sand or a burned refractory solid, and in a cyclic operation very fine particles of such a solid can rather easily be removed by attrition or otherwise and build up to an undesirable concentration in the active contact agent.

In the continuous filtering process of the present invention, the dust-containing gas which is to be purified, with or without an initial rough separation as later described, is first filtered through a mass of filter medium having preferably the same chemical composition as the dust, but having a particle size of a different order of magnitude. For example, when using a catalyst powder of the order of 200 mesh or finer, the filtering agent may consist of coarse catalyst granules having a size such as from 10 to 50 mesh or even coarser.

In one embodiment of this invention, the filtering medium, after having been employed as a filter, is stripped of the powder by blasting with a gas which is later introduced into the stream of reactant or reaction products, so that the catalyst powder recovered from the filter is returned to the process for further use. In a more simplified embodiment, both the filtering medium and the catalyst powder separated thereon are introduced together into the reaction zone. Also, according to one phase of the invention, the filtering is carried out in a continuous manner by passing the gases to be cleaned in contact with a moving filter bed containing the coarse granular material.

For a better understanding of the invention, reference will now be made to the accompanying drawings, wherein—

Fig. 1 is a diagrammatical illustration of an apparatus for catalytic cracking of hydrocarbon oils in which the invention finds particular application;

Fig. 2 is a similar view illustrating another modification.

Referring to Fig. 1, the gases to be reacted, which, in the particular case illustrated, consist of oil vapors to be cracked, are introduced into the apparatus through line 10 from where they pass to a mixing chamber 11, wherein they are intermixed with catalyst powder introduced through conduit 12.

The catalyst powder introduced into the mixing chamber 11 may be any desired cracking catalyst such as activated clays or synthetic gels of silica-alumina, silica-magnesia, and the like, which may be metallized or otherwise compounded in certain cases. The catalyst is preferably in a finely-divided state, the bulk of which may be capable of passing a 200 mesh screen or finer.

To insure the proper flow into the mixing chamber, the catalyst powder should be under a pressure sufficient to feed it into the oil vapors. These vapors in turn must be under a pressure at least adequate to overcome the pressure drop through the cracking, separating, and fractionating equipment, and may be substantially higher. The pressure on the catalyst may be developed by constructing the conduit 12 in the form of a vertical standpipe or column, into which a fluidizing gas may be introduced at any one or more spaced points through manifold line 13 and branch lines leading therefrom in a quantity sufficient to maintain the catalyst in freely flowing state, so that the pressure built up by the vertical column can be transmitted to the bottom thereof. The height of the column or standpipe should be sufficient to develop sufficient pressure to feed the catalyst into the oil stream. The mixture of catalyst and oil vapors to be cracked passes from the mixing chamber 11 through line 14 to the reaction chamber or catalyst converter 15 in which the oil vapors are maintained for a period sufficient to obtain the desired cracking. The converter 15 should be under the desired cracking temperature, such as from 750° to 1000° F. and the time of contact of the oil vapors within the cracking chamber may be of the order of from 5 to 50 seconds or more.

The time required for the passage of the powdered catalyst through the converter 15 may be in the same order of magnitude as that for the passage of the oil vapors, or the velocity of the vapors may be such that the catalyst passes through the reaction at a materially slower rate than the oil vapors.

In any event, the cracked products containing the catalyst in suspension therein are removed from the reaction chamber 15 through line 16 and may pass through a suitable separator such as a cyclone separator 17 in which the bulk of the finely-divided powdered catalyst is separated from the cracked products.

The powdered catalyst separated in the separator 17 discharges into a vertical conduit or standpipe 18 into which a fluidizing gas from a manifold line 19 may be introduced at any one or more spaced points through suitably valved branch lines. Cracked products separated from the bulk of the catalyst in the separator 17 but still containing residual powder entrained therein are removed from the initial separator 17 through line 21. If desired, additional cyclone separators (not shown) may be provided for further purification of the cracked products. In any event, the cracked products still containing some entrained powder pass through line 21 to a filtering chamber 22 wherein they pass through a stream of coarse granular filtering medium.

The composition of the filtering medium depends on the nature of the process and of the catalyst employed therein. In some processes an inert material such as sand may be used, but in other cases quartz causes agglomeration of catalyst particles and must be avoided. Some catalysts are sensitive to small amounts of certain elements; for example, some dehydrogenation catalysts are deactivated by a few tenths of a per cent of copper or of iron. In other cases, substances such as iron and nickel may be preferred as filtering media because of their densities and the possibility of magnetic separation from entrained powder. In general, however, it is preferred to use as the filtering medium a material which has the same composition as the catalyst since this insures against poisoning the catalyst during its intimate contact with the filter medium.

The filtering medium may, for example, have a particle size ranging from 5 mesh to 100 mesh more or less. To insure distribution of the cracked vapor through the filter bed of granular material, the bottom of the filtering chamber 22 may be provided with a false perforated bottom 23 having perforations of a size permitting the flow of gases and finely-divided material but which will prevent passage of the coarse granular filtering agent.

The cracked vapors after passing through the filter bed in the filter chamber 22 are removed from the top thereof through line 24 and may be passed through line 25 to the fractionating tower 26 wherein the cracked vapors are fractionated to condense insufficiently cracked constituents as reflux condensate. The condensate formed in the fractionating tower 26 may be withdrawn from the bottom thereof through line 27 and vapors remaining uncondensed in the fractionating tower 26 are removed overhead through line 28 and may be passed through a suitable condensing and separating equipment for separation of the final product.

The filter medium consisting of the coarse granular material after passing through the filter chamber 22 discharges into a vertical column or standpipe 29 into which a fluidizing gas may be introduced at one or more spaced points through manifold line 31. The filtering agent containing the dust removed from the cracked products discharges from the standpipe or vertical column 29 into a mixing chamber 32 in which it is admixed with a suitable stripping gas introduced through line 33. This stripping gas may be relatively inert with respect to the cracked products and may comprise steam, nitrogen, hydrogen, or the like, or the stripping gas may consist of the oil vapors to be cracked. In either event, the stripping gas in admixture with the filtering agent and powdered material segregated from the cracked products is transferred from the mixing chamber 32 through line 34 to a suitable separator 35 wherein the coarse granular material is separated from the remaining stream. Such a separator may, for example, consist of a rough cyclone separator, any suitable type of classifier or elutriator which will remove the coarse granular material but which will not slow down the velocity of the stripping gas to a point such as to permit separation of the finely-divided powder removed from such coarse granular mass. If desired, additional stripping gas may be admitted to the bottom of the separator from manifold line 31. The coarse granular material separated in the separator 35 discharges through line 36 containing a suitable pressure release valve 37 into the top of filter chamber 22 for further use. The pressure release valve 37 may consist, for example, of a star feeder, turbine, worm screw, adjustable orifice plate, or other device for reducing pressure on the powder prior to return to the settling chamber 22.

The stripping gas, together with the powder recovered from the filtering medium in the separator or classifier 35 is removed through line 38. In cases where the stripping gas is an inert material such as steam, this stream of gases may be passed through line 39 and blended with cracked products from the line 16 prior to passing through the separator 17. In cases where the stripping gas consists of reaction gases such as oil vapors to be cracked, the stream of oil vapors containing the residual catalyst powder may be returned to the reaction zone either through line 40 or through line 41. In some cases all of the oil vapors may be employed as a stripping medium for the filtering agent. In such cases all of the reaction vapors are introduced into the system through line 33 rather than through line 10.

In many cases it may not be necessary or desirable to subject the oil vapors to filtering treatment for the removal of the powdered material before passing the same to the fractionating tower, since the initial condensate formed in the fractionating tower will contain all of the powdered material retained in the cracked vapors. Consequently, if desired, the filtering chamber for the cracked vapor may be omitted and the overhead from the separator 17 passed through lines 21, 42, and 25 to the fractionating tower 26. When operating in this manner, the fractionating tower 26 may be provided with a suitable trap-out tray 43 so that the initial condensate formed in the fractionating tower may be segregated from the remainder of the condensate.

Returning again to the standpipe 18, the catalyst discharges therefrom into a mixing chamber 44 wherein it admixes with a regenerating gas introduced through line 45. The regenerating gas is preferably an oxidizing gas such as air capable of oxidizing the carbonaceous deposits formed on the catalyst during the cracking operation.

The suspension of regenerating gas and catalyst to be regenerated is transferred from the mixing chamber 44 through line 46 to a regenerating chamber 47 wherein the desired regeneration of the catalyst is accomplished. The catalyst is retained within the regenerator 47 for a period sufficient to accomplish the regeneration and is then transferred through line 48 to a separator 49 which may be in the form of a cyclone separator or other equivalent device for segregating the regenerated catalyst from the regeneration gas. The regenerated catalyst separated in the cyclone 49 discharges into the standpipe or vertical column 12 from whence it is returned to the cracking system as previously described. The regeneration gas, after passing through the separator 49 and after having a bulk of the regenerated catalyst removed therefrom, is withdrawn from the separator 49 through line 51. This stream of regeneration gas may, if desired, be passed to other separators for further purification. Since the spent gas is normally vented to the atmosphere, it is particularly desirable to completely remove the powdered materials from the gas. To this end the regeneration gas, after passing through one or more cyclone separators 49, is passed through line 51 to a filtering chamber 52 which may be of a construction similar to the filtering chamber 22 previously described.

The regeneration gas passes through the filtering chamber 52 countercurrent to the flow of coarse granular material moving downwardly through the filtering chamber. This last-named material serves as a filtering agent for removal of the final traces of powder from the spent gas before venting the same to the atmosphere. The regeneration gas after passing the filtering chamber 52 is withdrawn therefrom through line 53 and is rejected from the system. The coarse granular material, after passing through the filtering chamber 52, discharges into a vertical standpipe 54 into which a fluidizing gas from line 55 may be introduced at one or more spaced points through suitable branch lines. The coarse granular filtering material containing the powdered material filtered from the regeneration gas discharges from the standpipe 54 into a mixing chamber 56 into which is introduced a stripping gas through line 57. This stripping gas may be inert with respect to the regeneration gas and catalyst powder, or it may consist of a part or all of the regeneration gas introduced into the system. The suspension of stripping gas and filtering medium, together with the powdered material contained thereon, is transferred from the mixing chamber 56 through line 58 to a suitable separator 59 in which the coarse granular material is separated from the stream of stripping gas and powdered material.

The coarse granular material separated in the separator 59 discharges through line 61 and suitable pressure release valve 62 back into the top of the filtering chamber 52 for further use. If desired, additional stripping gas may be admitted to line 61 from manifold line 55 in order to strip completely all fine powder from the filtering medium.

The stripping gas from the separator 59 containing the powdered material recovered from the filtering medium entrained therein is removed from the separator through line 63. In case an inert stripping gas is employed the overhead stream from line 63 may be passed through lines 64 and 65 and used as a fluidizing gas in the standpipe 18, or it may be passed through lines 63 and 66 and combined with the stream of regenerating gas and catalyst suspension passing from the regenerating chamber 47 to the separator 49. In the latter case the finely-divided powder is recovered in the cyclone separator 49 and is returned to the cracking system.

In some cases it may be desirable to pass the suspension directly from regenerator 47 through lines 67 and 51 to the filter bed 52. In such cases the stripping gas and suspended powder are passed through lines 63, 66 and 48 to separator 49, and the powder is thereby returned to the system.

In case the stripping gas introduced into the system through line 57 is itself a regenerating gas, the overhead from the separator 59 may pass through lines 63, 64 and 45 to the inlet of the mixing chamber 44 wherein it is combined with powdered material from the standpipe 18. The stripping gas from line 63 may also be employed as a fluidizing gas in standpipes other than 18 by passing through suitable lines not shown.

It should be apparent from the foregoing that the last trace of powdered catalyst may be recovered from either the regenerating gas or the cracked vapors, or both, by passing it through a coarse granular bed of material and that the powdered material separated by the filtration is recovered from the coarse material by admixing with a stream of gas which is later reintroduced into the circuit. In case it is preferred to operate the filtering process with a higher gas velocity so that the total removal of solid is not affected, the fine dust will have been removed and substantially replaced by larger particles, which can be easily removed by auxiliary separators of the usual type.

Fig. 2 illustrates a modified form of the invention in which the total mixture of filtering agent and powdered material separated during the filtering treatment is passed into the cracking system. Referring to this figure, the oil vapor to be cracked is introduced into the system through line 70 and is passed to a mixing chamber 71 in which it admixes with powdered catalytic material in which is contained a substantial portion, amounting to 10% or more, of coarse granular material having a particle size of a different order of magnitude than the bulk of the powdered material contained therein. The resulting mixture of coarse granular material, finely-divided powdered catalyst, and oil vapors passes from the mixing chamber 71 through line 72 to a reaction chamber 73 wherein the oil vapors are retained for a period sufficient to obtain the desired degree of cracking. The products from the reaction chamber 73 are then removed from the chamber through line 74.

In cases where it is desired to regenerate the catalyst before returning it to the cracking section, the overhead from the cracking chamber 73 may be passed through lines 74 and 75 to a cyclone separator 76 or other equivalent device for segregation of the coarse granular material and powdered catalyst from the cracked product. The cracked vapors after passing through one or more separators 76 for the removal of solid material therefrom are removed overhead through line 77, which merges with line 78 leading to the fractionating tower 79 wherein the cracked products are fractionated. The solid separated in the separator 76 and consisting of the coarse granular material and the fine powdered material discharges from the cyclone separator 76 into a vertical column 80 from whence it passes into a mixing chamber 81 and is admixed with the regenerating gas introduced through line 82. The suspension of the regenerating gas and solid material formed in the mixing chamber 81 is transferred through line 83 to the regenerating chamber 84 in which the temperature is controlled to regenerate or burn off the carbonaceous deposits formed on the material during the cracking operation.

After the suspension of coarse granular material and the finely-divided catalyst is retained in the regenerating chamber 84 for a period sufficient to remove the carbonaceous deposit, the suspension is removed through line 85 which merges with line 86 leading to a suitable elutriator, classifier or the like identified by numeral 87 in which the coarse granular material is removed from the gas stream.

The coarse granular material separated from the gaseous stream in the elutriator 87 discharges through line 88 and release valve 89 into a filtering chamber 90.

The regenerating gas containing the finely-divided powder in suspension therein is removed from the elutriator 87 through line 91 and may be passed through a cyclone separator 92 or other equivalent device for separation of the bulk of the powdered catalyst from the regenerating gas which is removed therefrom through line 93. If desired, the gas may be passed through other separating devices for effecting further removal of the powdered catalyst therefrom. In any event, the gas from the line 93 is passed to the filter chamber 90 wherein it passes through the coarse granular material introduced through line 88. This coarse granular material moving through the filtering chamber 90 serves to filter out all of the dust contained in the regeneration gas. The purified gas is removed through line 94.

The filtering medium, after passing through the filtering chamber 90, discharges together with the fine powder into a standpipe or vertical column 95 and is passed directly to the mixing chamber 71 for readmixture with oil vapors to be cracked.

The bulk of the powdered catalyst as separated in the separator 92 discharges into a vertical column 96, which in turn may discharge into the vertical column 95 so that the catalyst may return to the mixing chamber 71 for reuse in the cracking system.

It is sometimes preferable to by-pass separator 92 and to filter the entire stream by passing the suspension from elutriator 87 through lines 91, 97 and 93 directly to filter 90.

In case catalyst regeneration is unnecessary, the suspension of catalyst and product vapors passing from reactor 73 through line 74 may be passed through lines 98 and 86 directly to the elutriator and filtering system, the catalyst-free products being withdrawn through line 94 and passed to suitable refining equipment not shown.

It will be understood that the standpipes shown in Fig. 2 may be supplied with suitable fluidizing gas as described in connection with Fig. 1 to prevent the catalyst from packing within the standpipes and to maintain the catalyst in a freely flowing state therein. Furthermore, while the use of standpipes has been shown for developing the necessary pressure for feeding the catalyst into the various streams of stripping gas, regenerating gas and reaction gases, it will be understood that other suitable devices may be employed for developing the necessary pressure. Such devices may, for example, comprise star feeders, compression screws or pressure hoppers, in which the catalyst is placed under a gas pressure before release into the system.

Having described the preferred embodiment of the invention, it will be understood that it is based upon such other variations and modifications as come within the spirit and scope thereof.

What is desired to be protected by Letters Patent is:

1. A process for carrying out reactions which comprises forming a suspension of gases and powdered catalyst, passing the suspension upwardly through the reaction zone maintained under conditions to bring about the desired reaction, passing reaction products containing powdered catalyst entrained therein from the upper part of said zone and through a filtering zone in contact with a moving bed of coarse granular material of the same composition as said powdered catalyst, removing the coarse granular material containing powdered catalyst from the filtering zone, treating the coarse granular material removed from said filtering zone with a stripping gas at a velocity sufficient to separate the powdered material from the coarse granular material and to carry said powdered material in said stripping gas, returning the coarse granular material to the filtering zone and combining the stripping gas containing said powdered material with said suspension.

2. The invention defined in claim 1 wherein the reaction involves the oxidation of combustible deposits formed on catalysts during the catalytic conversion of carbonaceous materials.

3. In a method of removing from a gas stream solids of varying particle size, the steps which comprise continuously separating a coarse fraction of said solids from the gas stream, thereafter separating the bulk of the remaining solids from the gas stream, and then filtering the gas stream containing residual fine solids through said coarse fraction only.

4. In a method of removing suspended solids from a gaseous stream, the steps which comprise passing said stream through a filter bed of coarse granular material within a filter zone, continuously removing coarse granular material and solids removed from said gas stream from the bottom of said filter zone, suspending the granular material and powder so removed in a stripping and carrier gas, transferring said last-named suspension to a point above the filter zone, thereafter separating the coarse granular material from the carrier and stripping gas and returning said material to the filter zone, separating the bulk of the remainder of said suspended solids from said stripping gas and thereafter combining said stripping gas containing the balance of the entrained solids with said first-named gaseous stream passing to said filtering zone.

5. The process for carrying out gas phase catalytic processes which comprises admixing the gases to be reacted with finely divided powdered catalyst to form a gas catalyst suspension, passing the resulting suspension through a reaction zone maintained under conditions for bringing about the desired reaction, thereafter separating the bulk of the powdered catalyst from the suspension, passing the gaseous reaction products so separated containing traces of powdered material entrained therein through a filtering zone in contact with a moving bed of coarse granular material to thereby filter the remainder of said powder from the reaction products, continuously removing said coarse granular material containing the remainder of powdered catalyst from the filtering zone, suspending it in a gas, separating therefrom the coarse material and returning the suspension of fine powdered catalyst to the first-named suspension.

6. A process for carrying out gas phase catalytic reactions which comprises forming a suspension of gases to be reacted and powdered catalyst, passing the resulting suspension through a reaction zone, thereafter separating the bulk of the powdered catalyst from the suspension, filtering the reaction products separated from said catalyst and containing traces of entrained powdered catalyst in a filtering zone containing a bed of coarse granular material so as to remove the remainder of said powdered catalyst entrained in the reaction products, continuously removing the mixture of coarse and powdered solids thus obtained from said filtering zone, suspending said mixture in a gas stream, thereafter separating coarse, granular material from said last-named stream and remixing the remaining suspension with the gases to be reacted.

7. In a process for the continuous regeneration of finely divided catalyst used in the conversion of hydrocarbons, the improvement which comprises mixing the separated catalyst with a regenerating gas capable of removing carbonaceous deposits, passing the resultant suspension through a regenerating zone, withdrawing the suspension of regenerated catalyst and spent regenerating gas into a separating zone where the bulk of the regenerated catalyst is removed from the regenerating gas, passing the remaining suspension in the separated regenerating gas into a filtering zone containing a bed of coarse particles of the same material as the catalyst to retain the powdered catalyst, withdrawing the mixture of coarse and powdered material, passing into said mixture a stripping gas, passing said material and gas into a separator so operated as to remove mainly coarse particles, returning the latter to the filtering zone and the suspension of powdered catalyst in the regenerating gas to the regenerating zone.

8. In a combination process for the continuous conversion of hydrocarbons by means of a finely powdered catalyst suspended in the vapors to be treated and for the continuous regeneration of the catalyst in the form of a suspension in the regenerating gas, the improvement which comprises using a finely powdered catalyst containing a substantial portion of catalyst having a substantially larger particle size, separating after the regeneration this portion from the suspension of the catalyst in the regeneration gases, withdrawing said separated portion into a filtering zone to form a filtering bed, removing from said suspension the bulk of the fine powdered catalyst, passing said fine powdered catalyst so removed directly to said conversion zone without passing the same through said filtering zone and then passing the gas containing traces of powdered catalyst through said filtering zone to remove the traces of powdered catalyst.

9. In a process for contacting gaseous fluid with solid particles comprising powdered contact particles and larger sized particles by suspending the particles in the gaseous fluid, the steps comprising separating after a contacting step the larger sized particles from the gaseous fluid suspension, collecting the separated larger sized particles in a filtering zone to form a filtering bed, removing from the remaining suspension after said separating step the bulk of the powdered contact particles, passing the suspension following the last mentioned removing step through said filtering zone to remove substantially all the remaining contact particles from the gaseous fluid.

10. A process for regenerating fouled catalyst which comprises forming a suspension of a regenerating gas and fouled powdered catalyst, passing the suspension into a regeneration zone maintained under conditions to bring about the desired regeneration, passing regeneration gases containing powdered catalyst entrained therein from said regeneration zone and through a filtering zone in contact with a moving bed of coarse granular material of the same composition as said powdered catalyst, removing the coarse granular material containing powdered catalyst from said filtering zone, treating the coarse granular material removed from said filtering zone with a stripping gas at a velocity sufficient to separate the powdered material from the coarse granular material and to carry the powdered material in said stripping gas, returning the coarse granular material to said filtering zone and combining the stripping gas containing said powdered material with said suspension.

11. A process for regenerating fouled catalyst which comprises suspending fouled powdered catalyst in a regenerating gas in a regeneration zone maintained under conditions to bring about the desired regeneration, passing regeneration gases containing powdered catalyst entrained therein from said regeneration zone and through a filtering zone in contact with a moving bed of coarse granular material of the same composition as said powdered catalyst, removing the coarse granular material containing powdered catalyst from said filtering zone, treating the coarse granular material removed from said filtering zone to recover the powdered material from the coarse granular material and returning the coarse granular material to said filtering zone.

12. A process for regenerating fouled catalyst particles which comprises passing regenerating gas and fouled catalyst particles into a regeneration zone maintained under conditions to regenerate the catalyst particles, passing regeneration gases containing entrained catalyst particles from said zone and through a filtering zone in contact with a moving bed of coarse granular material of the same composition as the catalyst particles to filter out entrained particles, removing from said filtering zone coarse granular material containing the filtered-out particles, recovering filtered-out particles from coarse granular material removed from said filtering zone and returning the coarse granular material to said filtering zone.

13. A process for regenerating fouled catalyst particles which comprises passing regenerating gas and fouled catalyst particles into a regeneration zone maintained under conditions to regenerate the catalyst particles, passing regeneration gases containing entrained catalyst particles from said zone and through a first separation zone to remove the bulk of the catalyst particles from said gases, then passing said gases through a filtering zone in contact with a moving bed of coarse granular material of the same composition as the catalyst particles to filter out entrained particles, removing from said filtering zone coarse granular material containing the filtered-out particles, treating the removed coarse granular material removed from said filtering zone to separate the filtered-out particles from the coarse granular material and returning the coarse granular material to said filtering zone.

14. In a process for the catalytic conversion of hydrocarbon oil wherein the catalyst becomes fouled, the steps which comprise mixing in a regeneration zone fouled catalyst separated from conversion products with a regenerating gas capable of removing carbonaceous deposits formed on said catalyst during conversion treatment, said regenerating zone being maintained under suitable conditions to remove a substantial portion of the carbonaceous deposits, thereafter withdrawing a suspension of regenerated catalyst and regenerating gas from said regenerating zone, passing the suspension withdrawn from said regenerating zone through a separating zone to separate the bulk of the regenerated catalyst from said regenerating gas, passing the regenerating gas from said separating zone through a filtering zone in contact with a moving bed of coarse granular material of the same composition as said conversion catalyst to thereby filter out powdered catalyst entrained in said regenerating gas, removing coarse granular material containing the powdered catalyst from said filtering zone, separating the powdered catalyst therefrom and returning the coarse granular material to said filtering zone.

15. In a process for the catalytic conversion of hydrocarbon oil wherein the catalyst becomes fouled, the steps which comprise mixing in a regeneration zone fouled catalyst separated from said conversion products with a regenerating gas capable of removing carbonaceous deposits formed on said catalyst during conversion treatment, passing the regenerating gas upwardly through said regenerating zone maintained under conditions sufficient to remove a substantial portion of the carbonaceous deposits, thereafter withdrawing regeneration gases containing entrained regenerated catalyst from said regenerating zone and passing them through a gas-solids separating zone and separating the bulk of the regenerated catalyst from the regenerating gas therein, passing the regenerating gas from said separating zone through a filtering zone in contact with a moving bed of coarse granular material of the same composition as said conversion catalyst to thereby filter out powdered catalyst entrained in said regenerating gas, removing coarse granular material from said filtering zone, recovering the powdered catalyst therefrom and returning the coarse granular material to said filtering zone.

16. A process according to claim 1 wherein the reaction involves the oxidation of combustible deposits from a catalyst used in the catalytic conversion of carbonaceous materials and the gas used to form the suspension of catalyst and the stripping gas comprise an oxygen-containing gas.

HOMER J. HALL.
JOHN C. MUNDAY.